(12) United States Patent
Kise et al.

(10) Patent No.: US 10,608,504 B2
(45) Date of Patent: Mar. 31, 2020

(54) ROTARY ELECTRIC MACHINE

(71) Applicant: MITSUBISHI ELECTRIC CORPORATION, Chiyoda-ku (JP)

(72) Inventors: Koji Kise, Chiyoda-ku (JP); Yu Hirotani, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 270 days.

(21) Appl. No.: 15/557,365

(22) PCT Filed: Jan. 8, 2016

(86) PCT No.: PCT/JP2016/050479
§ 371 (c)(1),
(2) Date: Sep. 11, 2017

(87) PCT Pub. No.: WO2016/189886
PCT Pub. Date: Dec. 1, 2016

(65) Prior Publication Data
US 2018/0248447 A1    Aug. 30, 2018

(30) Foreign Application Priority Data
May 28, 2015   (JP) .................... 2015-108609

(51) Int. Cl.
*H02K 9/06* (2006.01)
*H02K 1/27* (2006.01)
*H02K 1/28* (2006.01)

(52) U.S. Cl.
CPC .............. *H02K 9/06* (2013.01); *H02K 1/276* (2013.01); *H02K 1/28* (2013.01)

(58) Field of Classification Search
CPC .......... H02K 1/27; H02K 1/272; H02K 1/274; H02K 1/2773; H02K 1/276; H02K 1/278; H02K 1/28
(Continued)

(56) References Cited

U.S. PATENT DOCUMENTS 6,967,420 B2 * 11/2005 Laurent ................ H02K 1/2773
                                                310/156.51
8,018,111 B2 *  9/2011 Kinjou .................... H02K 21/14
                                                310/156.53
(Continued)

FOREIGN PATENT DOCUMENTS

JP     09-233750 A    9/1997
JP     09-233767 A    9/1997
(Continued)

OTHER PUBLICATIONS

International Search Report dated Mar. 22, 2016 in PCT/JP2016/050479 filed Jan. 8, 2016.

*Primary Examiner* — Nguyen Tran
(74) *Attorney, Agent, or Firm* — Oblon, McClelland, Maier & Neustadt, L.L.P.

(57) ABSTRACT

A rotary electric machine including a stator and a rotor. The stator includes a stator core and an armature winding. The rotor includes a rotor core and a plurality of permanent magnets. The rotor core is disposed on the periphery of a shaft such that a magnetic gap is formed between the rotor core and the stator. The plurality of permanent magnets project in a rotary axis direction from an end face of the rotor core. The rotary electric machine further includes a plurality of magnet holding portions provided respectively on parts of the plurality of permanent magnets that project from the end face of the rotor core. Spaces are provided between the plurality of magnet holding portions.

11 Claims, 12 Drawing Sheets

(58) Field of Classification Search
USPC ............ 310/156.38, 156.43, 156.44, 156.46, 310/156.61, 156.53
See application file for complete search history.

(56) References Cited

U.S. PATENT DOCUMENTS

2002/0117927 A1* 8/2002 Kim ........................ F01D 15/10
310/191
2008/0284270 A1* 11/2008 Tajima .................. B60L 15/025
310/156.53

FOREIGN PATENT DOCUMENTS

| | | |
|---|---|---|
| JP | 2003-250248 A | 9/2003 |
| JP | 2005-304177 A | 10/2005 |
| JP | 2014-233100 A | 12/2014 |
| JP | 2014-241691 A | 12/2014 |
| JP | 2015-002651 A | 1/2015 |

* cited by examiner

ROTARY ELECTRIC MACHINE

TECHNICAL FIELD

This invention relates to a rotary electric machine having an air blowing capacity that is induced by driving the rotary electric machine to rotate.

BACKGROUND ART

A rotary electric machine according to PTL 1 includes permanent magnets that project in a rotary axis direction from an axial direction end face of a rotor core. In a rotary electric machine according to PTL 2, a cooling performance is improved by disposing fan blades on an end portion of the rotor core.

CITATION LIST

Patent Literature

[PTL 1] Japanese Patent Application Publication No. 2013-21844 (claim 1 and FIG. 7)
[PTL 2] Japanese Patent Application Publication No. H9-233767 (claim 1 and FIG. 1)

SUMMARY OF INVENTION

Technical Problem

A problem occurring in a rotary electric machine is that when a temperature increase occurs due to heat generation, the permanent magnets in the rotor core are demagnetized, leading to a reduction in torque. Another problem is that an armature winding disposed on a stator increases in temperature when energized.

This invention has been designed to solve the problems described above, and an object thereof is to obtain a rotary electric machine exhibiting an improved cooling performance with respect to a rotor and a stator.

Solution to Problem

To achieve the object described above, this invention is a rotary electric machine including a stator and a rotor, the stator including a stator core and an armature winding, the rotor including a rotor core and a plurality of permanent magnets, and the rotor core being disposed on the periphery of a shaft such that a magnetic gap is formed between the rotor core and the stator, wherein the plurality of permanent magnets project in a rotary axis direction from an end face of the rotor core, the rotary electric machine further includes a plurality of magnet holding portions provided respectively on parts of the plurality of permanent magnets that project from the end face of the rotor core, and spaces are provided between the plurality of magnet holding portions, the spaces opening onto an outer peripheral side of the rotor.

Advantageous Effects of Invention

According to this invention, a cooling performance obtained with respect to the rotor and the stator can be improved.

DESCRIPTION OF EMBODIMENTS

Figure 1:
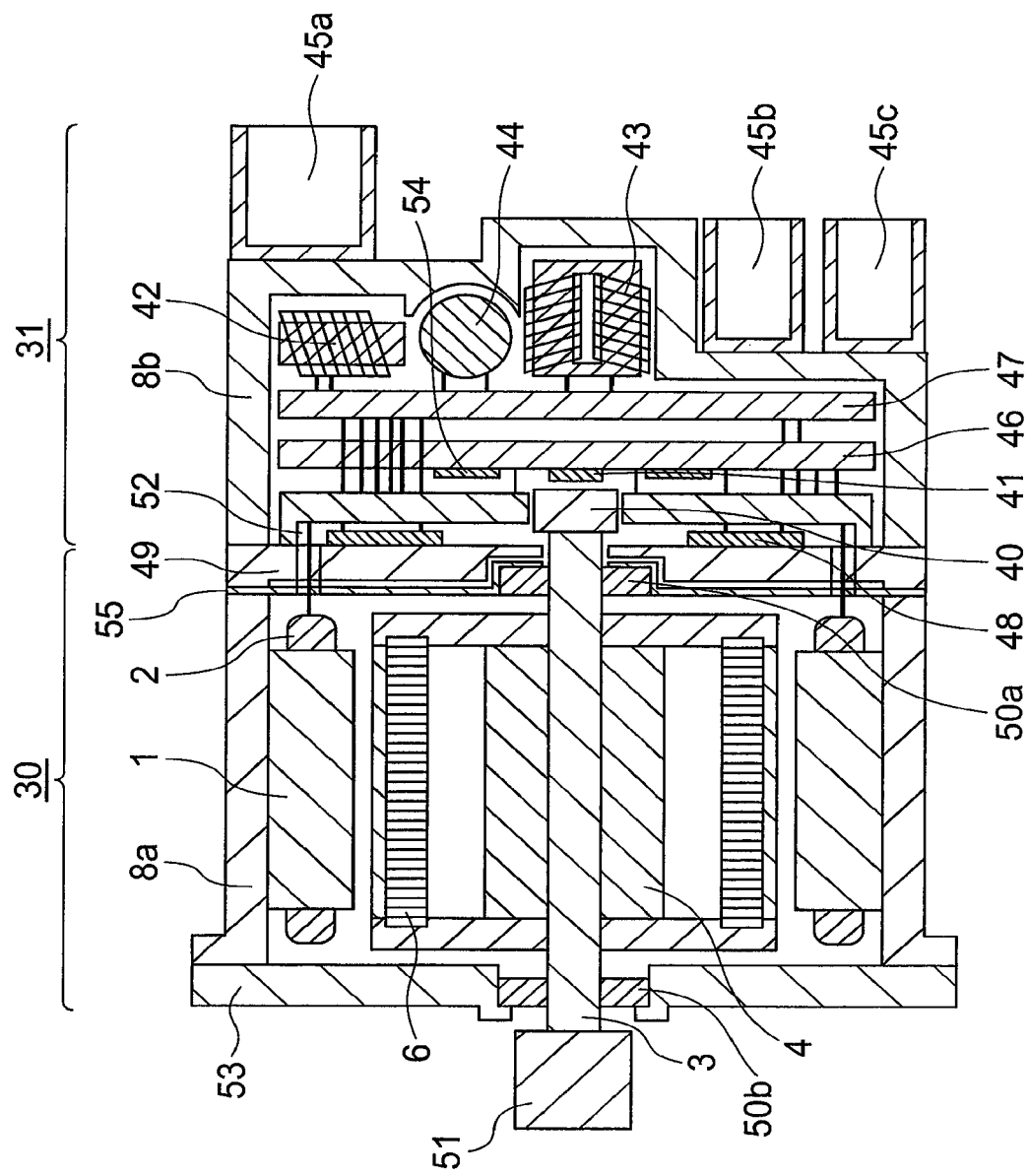
FIG. 1 is an overall sectional view showing a rotary electric machine according to a first embodiment.

Embodiments of this invention will be described below on the basis of the attached figures. Note that in the figures, identical reference numerals denote identical or corresponding parts.

First Embodiment

In this embodiment, an electric power steering device that assists a steering wheel operation of an automobile will be described as an example of a rotary electric machine. FIG. 1 is an overall sectional view showing the rotary electric machine according to the first embodiment. The rotary electric machine is structured such that a motor 30 and a control device 31 are coupled to each other integrally.

Information relating to the automobile, such as a vehicle speed, is transmitted to the control device 31 via a connector 45b and a connector 45c. The control device 31 calculates a required assist torque, and supplies the motor 30 with a current required to drive the motor 30 by an appropriate torque. The motor 30 rotates a pulley 51 that is press-fitted onto one tip end portion of a shaft 3, whereby assist torque is applied to a steering wheel via the pulley 51.

A circuit board 47 and a control board 46 are installed on the control device 31. A capacitor 44 for smoothing a current input by a connector 45a, and noise reducing coils 42, 43 are installed on the circuit board 47.

An operation element 54 for calculating the required assist torque and a rotation sensor 41 for monitoring a rotation speed of the motor are installed on the control board 46. The rotation sensor 41 monitors the rotation speed of the motor by monitoring variation in magnetic flux generated by a sensor permanent magnet 40 attached to the other tip end portion of the shaft 3.

By calculating the required assist torque with the control board 46 to drive a power element 48, a required current waveform is generated. The power element 48 is connected to the motor 30 via a wire 52. Heat generated by the power element 48 is transmitted to a heat sink 49, and dissipated into outside air from a region in which the heat sink contacts the outside air. Further, the heat sink 49 is connected to a motor side casing 8a and a control device side casing 8b such that heat corresponding to a temperature difference between the heat sink 49 and the casings 8a, 8b moves therebetween. The heat is dissipated into the outside air similarly from regions in which the casings 8a, 8b contact the outside air.

The motor 30 is constituted by a stator and a rotor. The stator includes a stator core 1 formed by laminated electromagnetic steel plates, and an armature winding 2 wound around the stator core 1 via an insulating material, and is fixed to the casing 8a. The armature winding 2 is connected to the control device 31 via the wire 52.

The rotor includes a rotor core 4, and permanent magnets 6 embedded in the rotor core. The shaft 3 is press-fitted into the interior of the rotor core 4. The shaft 3 is fixed to a housing 53 and a shaft holding plate 55 via bearings 50a, 50b so as to be capable of rotating.

Various components, such as the armature winding 2 and the stator core 1 in the motor 30, the power element 48 in the control device 31, the components mounted on the circuit board 47 and the control board 46, the capacitor 44 and the noise reducing coils, generate heat in response to the current used to drive the rotary electric machine. This embodiment relates to a closed type rotary electric machine in which air in the interior of the casing is not exchanged with the outside air, and therefore the heat generated in the interior is transmitted to members that contact the outside air, such as the casing 8a, the heat sink 49, the casing 8b, and the shaft 3, along various paths by conduction, radiation, convection, and so on, and is dissipated therefrom into the outside air.

The permanent magnets 6 in the rotor and the stator core 1 also generate small amounts of heat. Moreover, the heat generated by the stator core 1 is transmitted to the rotor core 4 by radiation, convection, and conduction. Accordingly, the temperature of the permanent magnets 6 increases. As a result of this temperature increase, the amount of magnetic flux generated by the permanent magnets 6 decreases, leading to a reduction in torque. The heat generated by the rotor is mainly transmitted from the shaft 3 to the casings 8a, 8b and the heat sink 49 through the bearings 50a, 50b, and then dissipated into the outside air. Alternatively, the heat is dissipated from a region in which the shaft 3 contacts the outside air. Alternatively, the heat is transmitted to the casings 8a, 8b and the heat sink 49 from the region in which the shaft 3 contacts the outside air, and then dissipated into the outside air. The rotor, similarly to the stator, is not connected to a casing that exchanges heat directly with the outside air, and therefore increases in temperature by a large amount even though the amount of heat generated thereby is smaller than that of the stator.

Figure 2:
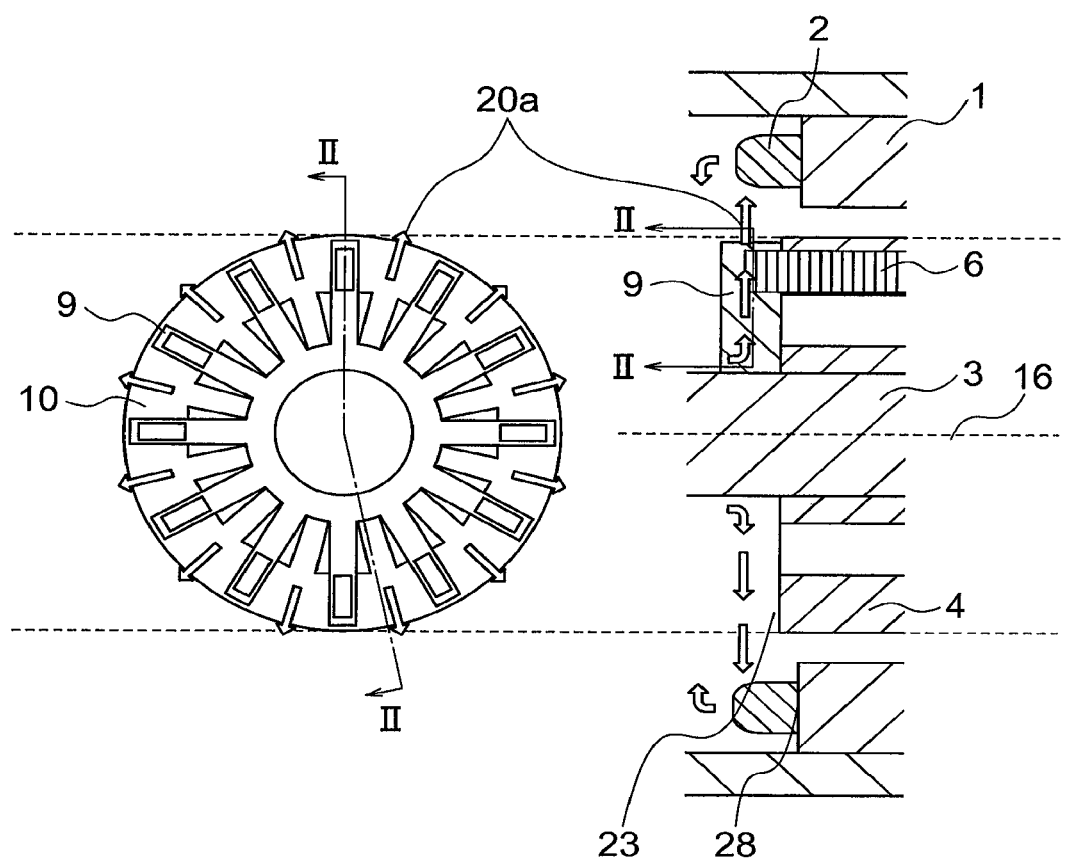
FIG. 2 is a sectional view showing the rotary electric machine according to the first embodiment.

Next, the content of the first embodiment of this invention will be described in detail. FIG. 2 is a sectional view showing the rotary electric machine according to the first embodiment of this invention, and a partially enlarged view of the motor 30 shown in FIG. 1. Note that the right side view in FIG. 2 is a view taken along a II-II line on the left side view in FIG. 2.

The rotor core 4 includes an end face 23 that projects further in the direction of a rotary shaft 16 than a rotary axis direction end face 28 of the stator. The permanent magnets 6 of the rotor are structured such that respective parts thereof project further than the end face 23 of the rotor core 4. A part of the magnetic flux generated by the permanent magnets 6 returns to the permanent magnets 6 through a region of air on an end portion of the rotor. This magnetic flux does not contribute to the torque of the rotary electric machine, and therefore forms magnetic flux leakage. By forming the permanent magnets 6 to project, magnetic flux leakage can be suppressed, leading to an increase in the torque of the rotary electric machine.

According to this embodiment, in the structure described above, a plurality of magnet holding portions are provided respectively on the parts of the plurality of permanent magnets that project from the end face of the rotor core. The plurality of permanent magnets respectively extend in a radial direction and have an elongated shape in which a length thereof in a rotor radial direction is greater than a length thereof in a rotor circumferential direction. Similarly, the plurality of magnet holding portions respectively extend in the radial direction and have an elongated shape in which a length thereof in the rotor radial direction is greater than a length thereof in the rotor circumferential direction. Note that in this embodiment, the plurality of magnet holding portions each form a part of a single magnet holding member, and extend in the radial direction from an annular part positioned on an outer periphery of the shaft. Spaces (fluid flow spaces) 10 are provided respectively between the magnet holding portions 9, which serve to prevent the projecting end portions of the permanent magnets 6 from chipping and increase a fixing strength thereof to a magnet core, in the circumferential direction. Respective pairs of adjacent magnet holding portions 9 are separated from each other on an outer peripheral side of the rotor core. In other words, the spaces 10 are structured to open onto the outer peripheral side of the rotor core. With this structure, a fluid flowing through the spaces 10 between the magnet holding portions 9 along the end face 23 of the rotor core from the rotary shaft 16 side toward the outer peripheral side of the rotor core can flow to the outside from the end face 23 of the rotor core. When the fluid is air, the spaces 10 serve as air passages for the fluid flowing from the rotary center toward the outer periphery, and the air flowing through the air passages is discharged to the outside from the outer periphery. The plurality of permanent magnets are shaped to extend thinly in the rotor radial direction, and therefore wide gaps are formed between adjacent permanent magnets in the rotor circumferential direction. As a result, the air can be discharged favorably. Moreover, the magnet holding member is fixed to the shaft 3 by press-fitting.

Figure 13:
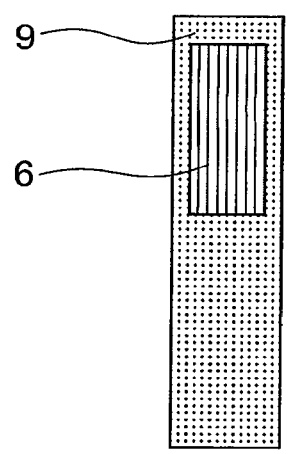
FIG. 13 is a view showing a condition in which a permanent magnet is covered by a magnet holding portion.
Figure 14:
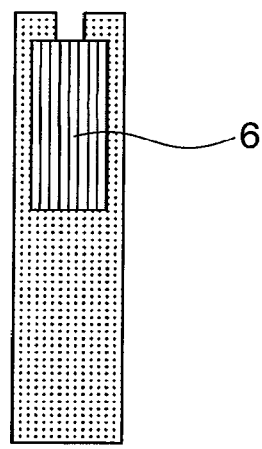
FIG. 14 is a view showing a condition in which a permanent magnet is partially covered by a magnet holding portion.

With this configuration, the magnet holding portions 9 function as fan blades when the shaft 3 rotates. Accordingly, airflows 20a can be generated in regions surrounded by respective pairs of the magnet holding portions 9 and the end face 23 of the rotor core 4. As a result, a cooling performance with respect to the permanent magnets 6 is improved, and demagnetization caused by temperature increases is alleviated. Further, the permanent magnets 6 projecting from the end face of the rotor core are embedded in the interior of the magnet holding portions 9 functioning as blades. As shown in FIG. 13, the magnet holding portion 9 covers the permanent magnet 6. Heat is dissipated from the surface of the permanent magnet 6 directly into the airflow 20a through the thickness of the magnet holding portion 9, and therefore, by reducing the thickness of the magnet holding portion 9, the heat can be dissipated into the airflow 20a more efficiently. The magnet holding portion 9 is in an almost adhered state with the permanent magnet 6. Hence, the magnet holding portion 9 also functions as a heat dissipating fin of the permanent magnet 6. When the airflow 20a flows over the surface of the magnet holding portion 9, an even greater cooling effect is obtained. Moreover, by causing the generated airflow to impinge on the armature winding 2, an improved cooling performance can be obtained with respect to the armature winding. Furthermore, in FIG. 14, the magnet holding portions 9 cover at least a part of the plurality of permanent magnets 6. Needless to mention, a cooling effect is obtained likewise with this shape. Note that FIGS. 13 and 14 are both sectional views taken along the II-II line in FIG. 2. In other words, FIGS. 13 and 14 are views showing a plane obtained by cutting one of the magnet holding portions 9 perpendicular to the rotary shaft 16 in an extension direction of the rotary shaft 16. Accordingly, the manner in which the magnet holding portion 9 surrounds the periphery of the permanent magnet 6 can be seen.

A gap is provided between the magnet holding portion 9 and the permanent magnet 6 in order to insert the permanent magnet 6. When the magnet holding portion 9 and the permanent magnet 6 are joined by an adhesive or the like, the gap, which forms an air layer, is preferably filled with resin in order to reduce thermal contact resistance and thereby achieve a temperature reduction. Note that the gap varies in volume in accordance with a difference between respective thermal expansion coefficients of the magnet holding portion 9 and the permanent magnet 6. In this embodiment, a soft adhesive is used, and partial locations where the adhesive is not applied are provided. Hence, even when the volume of the gap varies due to the difference between the respective thermal expansion coefficients, the soft adhesive flows into the locations where the adhesive has not been applied, and as a result, stress exerted on the permanent magnet can be reduced.

Figure 15:
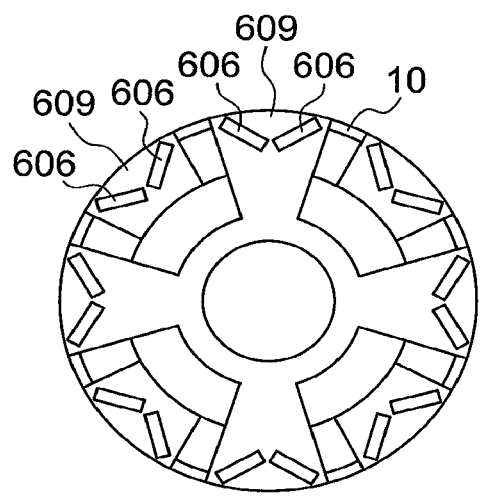
FIG. 15 is a sectional view showing a rotary electric machine according to a fourth embodiment of this invention.

Note that in this embodiment, the permanent magnets are embedded in the core interior, and are formed to be longer in the radial direction than in the circumferential direction. By forming the permanent magnets 6 in this space, the magnet holding portions 9 disposed on the periphery of the permanent magnets 6 can easily be formed in the shape of fan blades. However, even when the permanent magnets 6 are formed in another shape (for example, a permanent magnet shape that is long in an oblique direction, as shown in FIG. 15), the magnet holding portions 9 can be caused to function as a fan by providing the spaces 10 therebetween.

Figure 3:
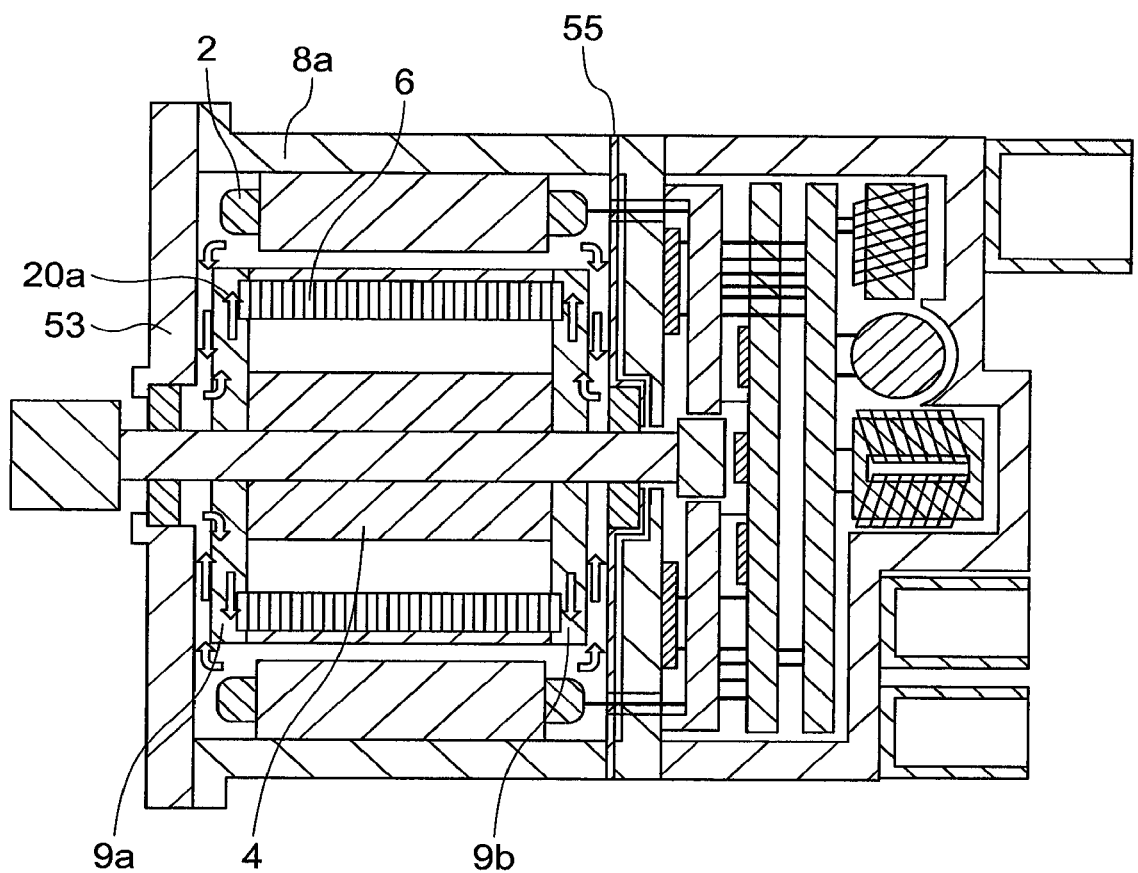
FIG. 3 is a sectional view showing the flow of an airflow according to the first embodiment.

FIG. 3 shows a flow of the airflow 20a when this embodiment is applied to a rotary electric machine. In FIG. 3, the magnet holding portions 9 (9a, 9b) provided with the space 10 are disposed on respective end portions of the rotor core 4. Hereafter, an airflow formed on the magnet holding portion 9a side will be described. The magnet holding portion 9a functions as a centrifugal fan so as to generate the airflow 20a, which serves as cooling air. The airflow 20a serving as cooling air impinges on the armature winding 2 so as to cool the armature winding 2, then flows between the housing 53 and the magnet holding portion 9a, and then returns to an inflow portion where the airflow 20a flows into the magnet holding portion 9a.

Hence, the airflow circulates through a space surrounded by the end face 23 of the rotor core 4 and the housing 53. The airflow 20a draws in heat while flowing near the rotor core 4, the magnet holding portion 9a, the permanent magnet 6, and the armature winding 2. The drawn heat is discharged into the outside air from the housing 53 and the casing 8a. As a result, the magnet holding portion 9a and the armature winding 2 are cooled. Similarly, the airflow formed on the magnet holding portion 9b side circulates through a space surrounded by the shaft holding plate 55 and the end portion of the rotor core 4.

By forming the permanent magnets 6 to project, magnetic flux leakage is suppressed, and to ensure that the suppression effect is not impaired, a non-magnetic material is used as the material of the magnet holding portion 9a. When a metal exhibiting favorable thermal conductivity, for example Al or SUS, is used, the heat of the rotor core 4 and the permanent magnet 6 is transmitted to the magnet holding portion 9a, and due to the fin effect, dissipation of the heat is promoted, thereby improving the cooling performance. Even when resin is used, however, thermal resistance can be reduced by reducing the thickness of the resin, and as a result, the heat can be dissipated from the surface of the magnet holding portion 9a.

Figure 4:
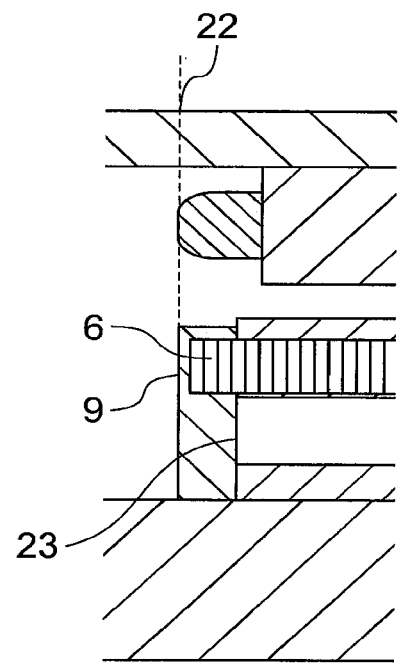
FIG. 4 is a sectional view showing a magnet holding member according to the first embodiment in a different arrangement to FIG. 2.
Figure 5:
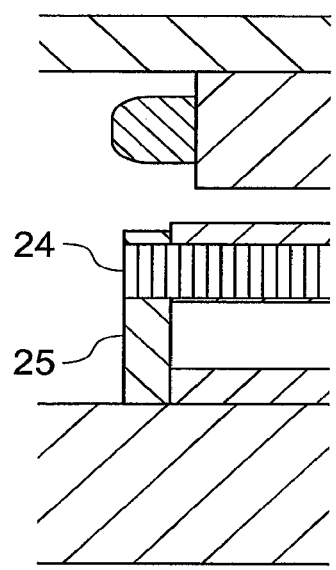
FIG. 5 is a sectional view showing the magnet holding member according to the first embodiment in a different arrangement to FIG. 2.
Figure 6:
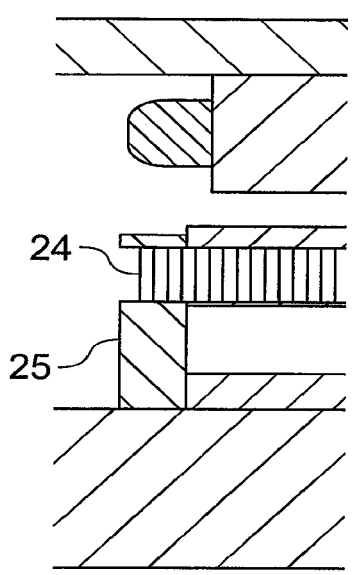
FIG. 6 is a sectional view showing the magnet holding member according to the first embodiment in a different arrangement to FIG. 2.

Modified examples of the first embodiment will now be described using FIGS. 4, 5, and 6. FIGS. 4, 5, and 6 are sectional views showing different arrangements of the magnet holding portion 9 to that shown in FIG. 2. In FIG. 4, the magnet holding portion 9 does not project from an end face 22 of the armature winding 2. A space region between the end face of the armature winding 2 and the end face 23 of the rotor core 4 is not typically used. With the configuration shown in FIG. 4, the magnet holding portion 9 is disposed in this region and caused to function as a fan, and in so doing, an increase in axial length can be suppressed.

In FIGS. 5 and 6, an end face 24 of the permanent magnet 6 is exposed to inside air. FIG. 5 shows a configuration in which an end face 25 of the magnet holding portion 9 and the end face 24 of the permanent magnet 6 are substantially aligned, while FIG. 6 shows a configuration in which the end face 24 of the permanent magnet 6 is further inward than the end face 25 of the magnet holding portion 9. In both FIG. 5 and FIG. 6, the magnet end face is exposed to inside air, and therefore the airflow directly contacts the magnet, leading to an improvement in the cooling performance.

According to the first embodiment, configured as described above, the magnet holding portions function as fan blades. Hence, a flow of cooling air is generated, making it easier to cool the permanent magnets, and as a result, demagnetization due to temperature increases is alleviated. The magnet holding portions also function as heat dissipating fins of the permanent magnets, leading to an improvement in the cooling performance. The cooling air impinges on an end portion of the armature winding, and therefore the armature winding can be cooled. The magnet holding portions prevent the magnet end portions from chipping, and improve the fixing strength thereof to the magnet core. Moreover, the plurality of magnet holding portions each form a part of the single magnet holding member, and the magnet holding member is press-fitted to the shaft. Hence, the magnets can be supported by fixing the magnet holding member to the shaft.

Second Embodiment

Figure 7:
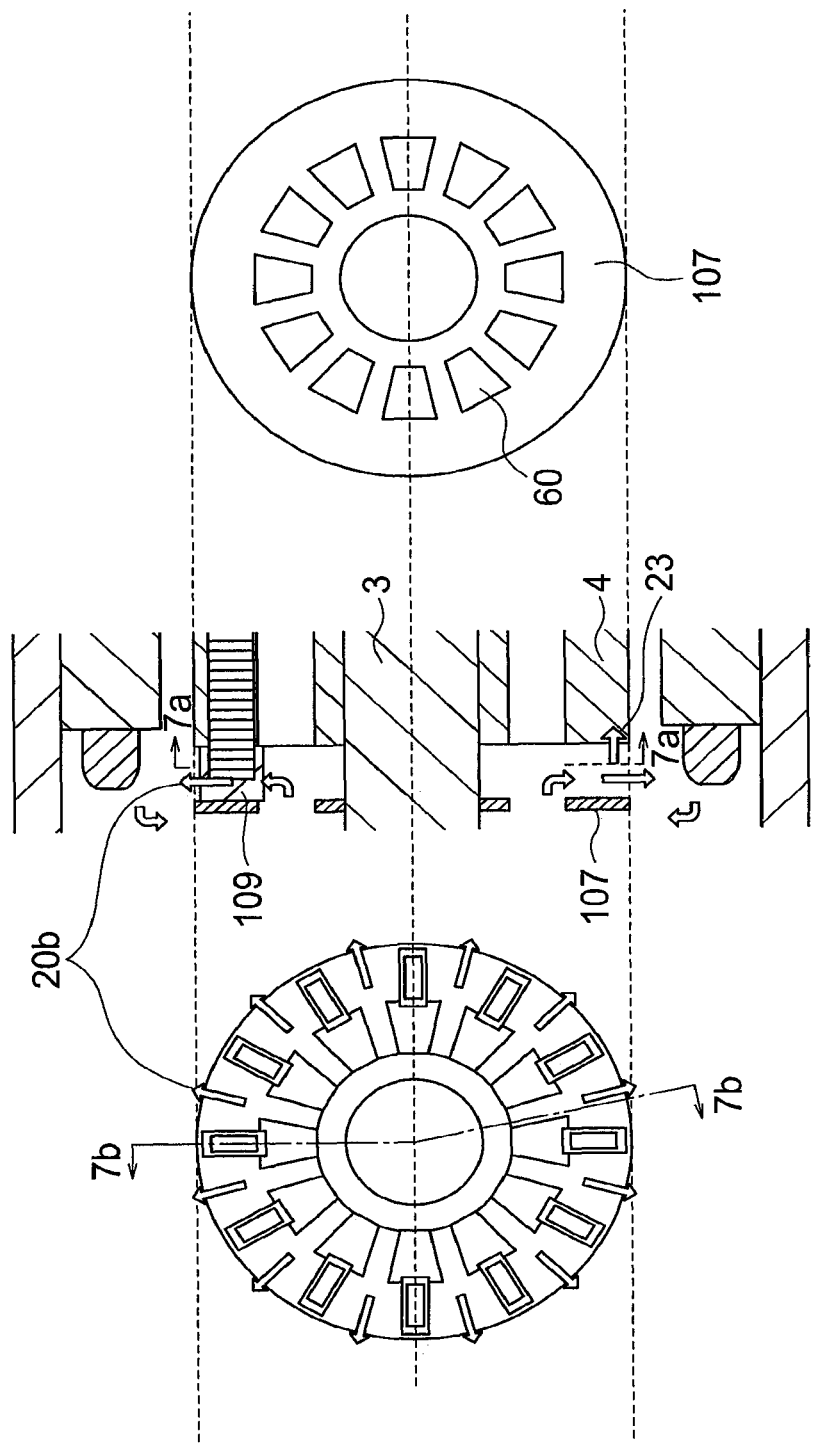
FIG. 7 is a sectional view showing a rotary electric machine according to a second embodiment of this invention.

Next, a second embodiment of this invention will be described. FIG. 7 is a sectional view showing a rotary electric machine according to the second embodiment of this invention. The left side view in FIG. 7 is a view seen from a position of a plane indicated by a reference numeral 7a on the central view in FIG. 7. Further, the central view in FIG. 7 relates to a circumferential direction position of a line indicated by a reference numeral 7b on the left side view in FIG. 7. Note that except for the parts described below, the second embodiment is assumed to be identical to the first embodiment, described above.

In this embodiment, as shown in FIG. 7, a plurality of magnet holding portions 109 are fixed to an end plate 107 fixed to the shaft 3.

With this configuration, the magnet holding portions 109 can be caused to function as fan blades. As shown on the right side view in FIG. 7, the end plate 107 is provided with opening portions 60. As a result, an airflow 20b is formed in a similar manner to FIG. 3 so as to circulate through the space surrounded by the end face 23 of the rotor core 4 and the housing 53. Note that the opening portions 60 formed in the end plate according to this embodiment have a substantially identical shape to a rotor opening portion 11, but as long as sufficient strength is maintained during rotation, there are no particular limitations on the shape thereof.

Figure 8:
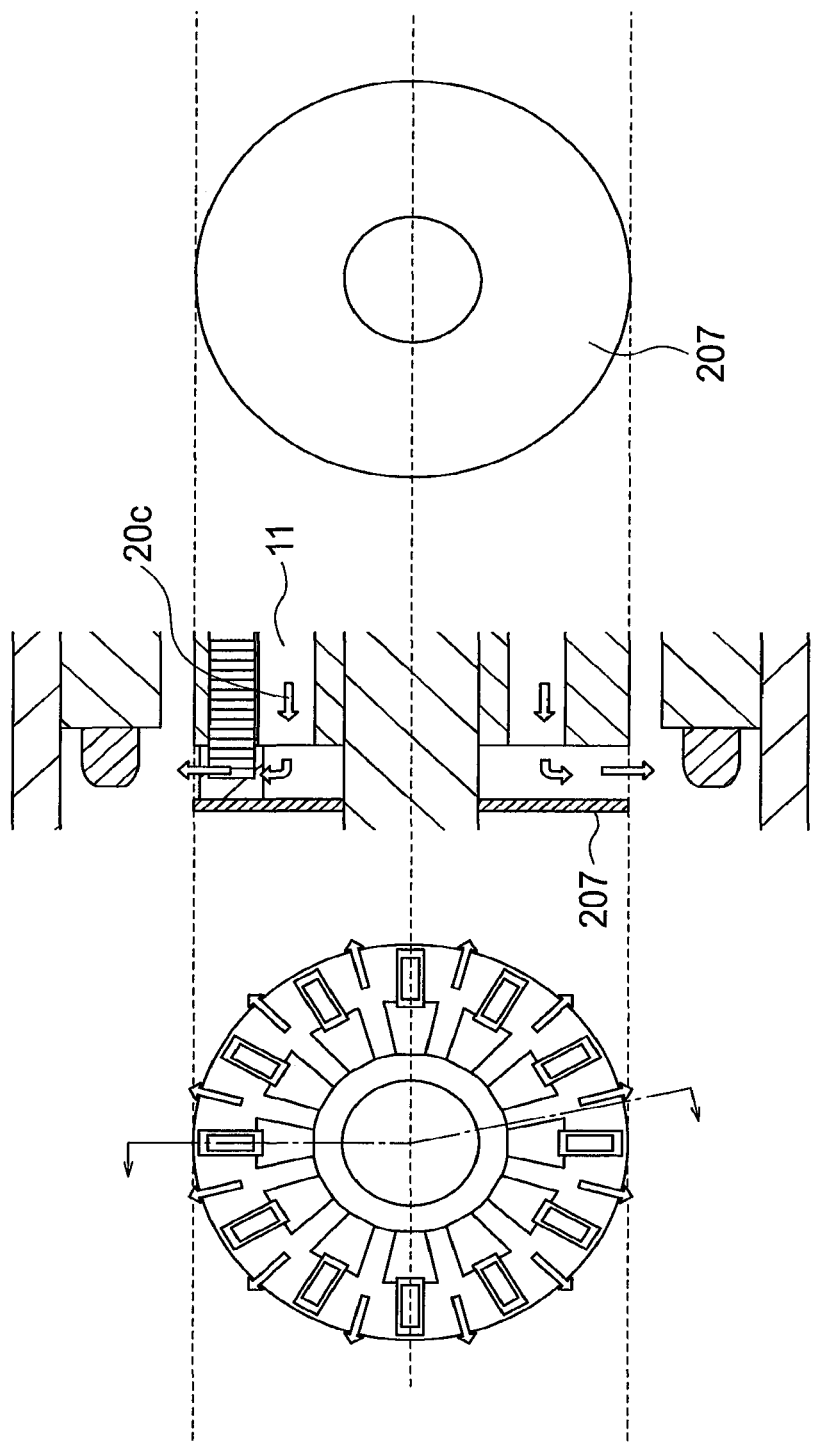
FIG. 8 is a sectional view showing the rotary electric machine in a case where openings are not provided in an end plate.

FIG. 8 is a sectional view showing the rotary electric machine in a case where the opening portions 60 are not provided in the end plate 107 in FIG. 7. When the opening portions 60 are provided in the end plate 107, pressure loss in an air passage along which air circulates through the space surrounded by the end face 23 and the housing 53 is smaller than pressure loss in a fluid flowing through the rotor opening portion 11, and therefore substantially no fluid flows to the rotor opening portion 11. When the opening portions 60 are not provided in the end plate 107, however, the fluid flows to the rotor opening portion 11 such that a central portion of the rotor core 4 can be cooled, and as a result, the magnets in the central portion of the rotor can be cooled.

Figure 9:
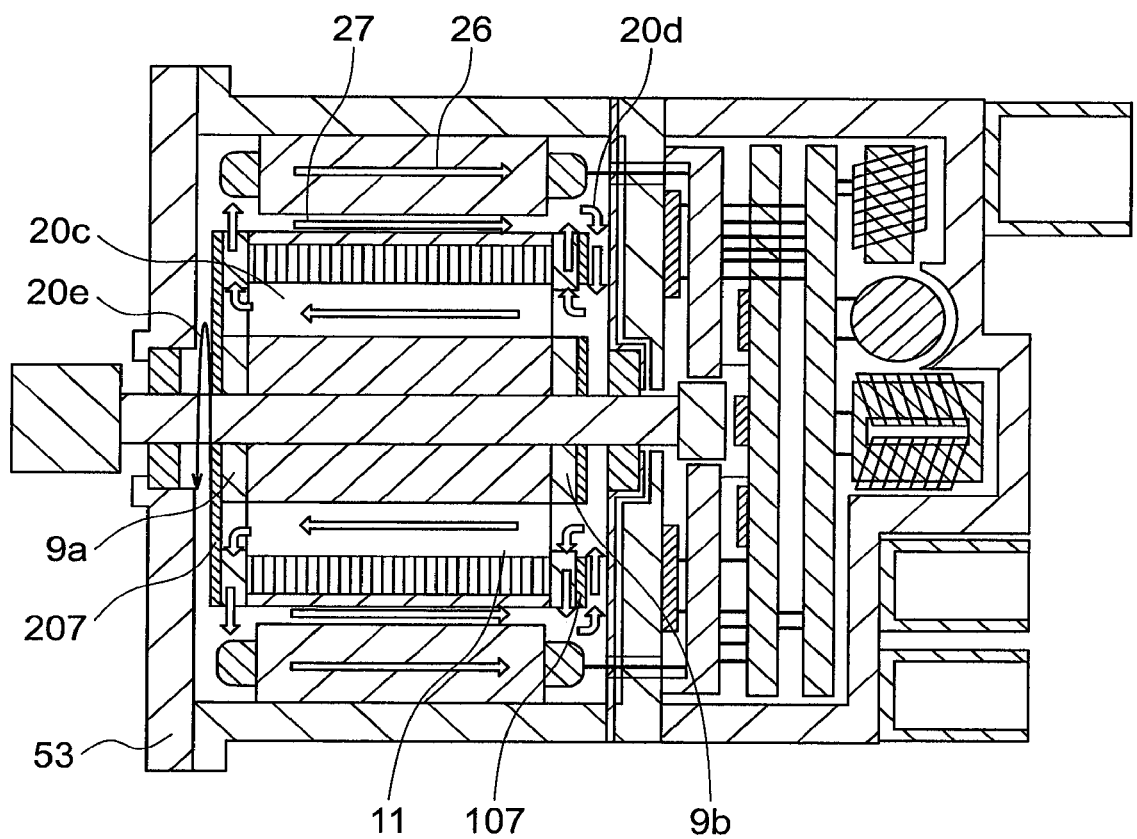
FIG. 9 is a sectional view showing a rotary electric machine according to a third embodiment and the flow of an airflow.

FIG. 9 is a sectional view of the rotary electric machine, showing the flow of the airflow. As shown in FIG. 8, the opening portions 60 are not provided in an end plate 207 attached to the magnet holding member on one end face side of the rotor core 4. As shown in FIG. 7, the opening portions 60 are provided in the end plate 107 attached to the magnet holding member on the other end face side of the rotor core 4.

Since the opening portions 60 are not provided in the end plate 207, an airflow 20c that circulates through the rotor opening portion 11, a space 26 in the armature winding, or a gap 27 between the stator core 1 and the rotor core 4 is generated by the fan blade (the magnet holding portion 9a).

Note that in FIG. 9, a fan blade (the magnet holding portion 9b) is attached to the end plate 107 in which the opening portions 60 are provided, and therefore an airflow 20d that circulates between the shaft holding plate 55 and the magnet holding portion is generated.

With this configuration, respective central portions of the stator core 1 and the rotor core 4 can be cooled in addition to the permanent magnets 6 and the armature winding 2. Note that since the end plate 207 rotates, a rotating airflow 20e is generated between the end plate 207 and the housing 53, thereby promoting heat transmission from the end plate 207 to the housing 53.

Note that even when the spaces 10 are not provided between the magnet holding portions connected to the end plate 107 and the permanent magnets 6 are fixed by normal magnet holding portions, the airflow 20c is generated by the fan function of the magnet holding portion 9a. As a result, the cooling performance is improved effectively.

Figure 10:
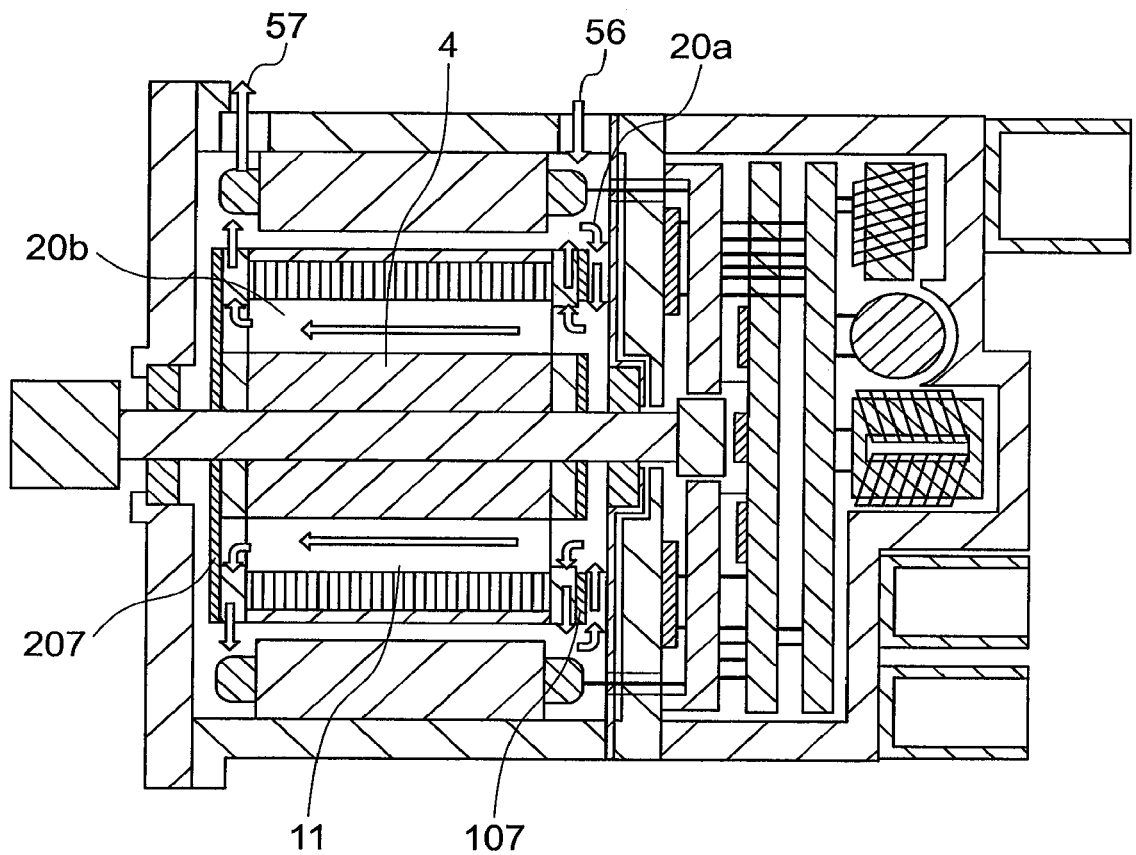
FIG. 10 is a sectional view showing an airflow of an open type rotary electric machine.

Further, FIG. 10 shows an airflow of an open type rotary electric machine in which fluid flows in from the outside air. FIG. 10 differs from FIG. 9 in that an opening portion 56 (an inflow portion) and an opening portion 57 (an outflow portion) are provided in the casing 8a. Filters for removing dirt are disposed in the opening portions 56, 57. When the opening portions are provided, substantially no fluid flows through the space 26 in the armature winding, and the gap 27 between the stator core 1 and the rotor core 4, in which the pressure loss is large, and instead, fluid flowing in from the inflow portion 56 flows through the rotor opening portion 11, draws in heat from the interior of the rotor core 4, and then flows out through the outflow portion 57. Hence, this invention can be applied to both a closed type rotary electric machine and an open type rotary electric machine.

According to the second embodiment, configured as described above, similar actions and effects to the first embodiment are obtained. Moreover, according to the second embodiment, the magnets can be supported by fixing the plurality of magnet holding portions to the end plate.

Third Embodiment

Figure 11:
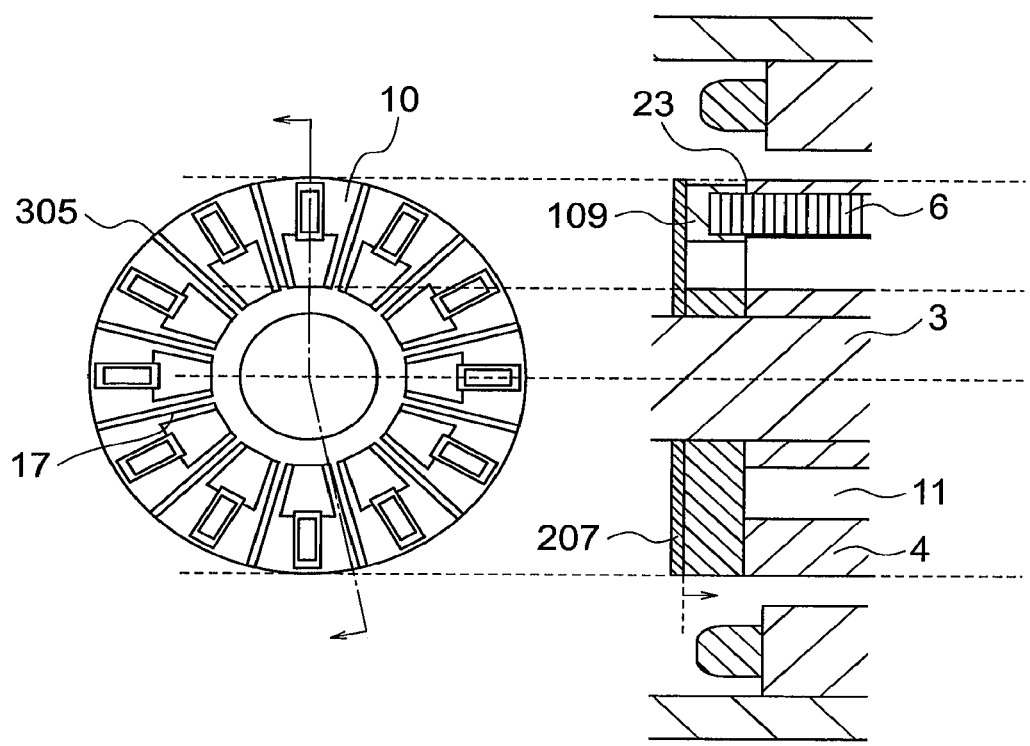
FIG. 11 is a sectional view showing the rotary electric machine according to the third embodiment of this invention.

Next, a third embodiment of this invention will be described. FIG. 11 is a sectional view showing a rotary electric machine according to the third embodiment of this invention, and is similar to FIG. 2. Note that except for the parts described below, the third embodiment is assumed to be identical to the first or second embodiment, described above.

Fan blades 305 press-fitted to the shaft 3 are provided in the spaces 10 provided between the plurality of magnet holding portions 109.

In this configuration, the spaces 10 are provided (in circumferential direction positions) between the magnet holding portions 109, and therefore the fan blades 305 can be disposed therein. By disposing the fan blades, an amount of air and a blade surface area are increased, leading to an increase in a heat dissipation surface area, and as a result, the cooling performance is improved. Further, in this embodiment, the fan blades are longer than the magnet holding portions. As a result, a driving force of the cooling air increases, leading to an increase in the amount of air.

Figure 12:
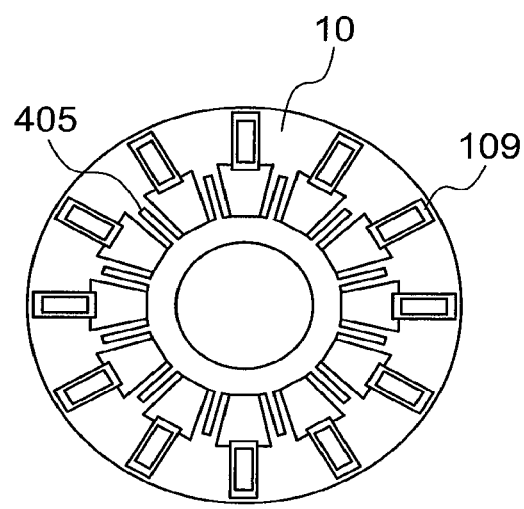
FIG. 12 is a sectional view showing the rotary electric machine according to the third embodiment of this invention when a fan having a different shape to that of FIG. 11 is used therein.

Note that by extending a tip end portion of the fan blade 305 to the outer peripheral portion of the rotor, the driving force of the fluid is increased, but the tip end portion does not necessarily have to be extended to the outer peripheral portion of the rotor. In FIG. 12, the fan blades are disposed further inward than the magnet holding portions 109. In other words, tip end portions of fan blades 405 end on a radial direction center side of the magnet holding portions 109. Likewise with this configuration, the spaces 10 are provided between the magnet holding portions 109, and therefore an airflow generated by the fan blades 305 can flow through the spaces 10 between the magnet holding portions 109 in addition to the airflow generated by the fan function of the magnet holding portions 109. Thus, increases in the amount of air and the heat dissipation surface area are obtained, and as a result, the cooling performance is improved.

Note that in the embodiment shown in FIG. 11, the end plate 207 is attached to the fan blades. However, the end plate 207 may be omitted, and the fan blades 305 may be fixed to the shaft 3 by press-fitting.

In FIG. 11 (a plane having the rotary center as a perpendicular), the fan blades 305 are disposed in a region formed by extending a support portion 17 of the rotor core 4 in the rotary axis direction, and therefore the flow of the fluid flowing to the fan blades 305 through the rotor opening portion 11 is not disturbed. As a result, an increase in pressure loss is suppressed. Further, in this embodiment, the fan blades closely contact the end face 23 of the rotor core 4, thereby promoting heat dissipation from the rotor core 4. Moreover, the material of the fan blades (the centrifugal fan) may be a non-magnetic material, a magnetic material such as iron, or resin. When a metal is used, an increase in the amount of heat dissipated by the fin effect is obtained.

Fourth Embodiment

Next, a fourth embodiment of this invention will be described. FIG. 15 is a sectional view showing a rotary electric machine according to the fourth embodiment of this invention. Note that except for the parts described below, the fourth embodiment is assumed to be identical to the first to third embodiments, described above.

In the rotary electric machine according to the fourth embodiment, a plurality of permanent magnets 606 are allocated to each pole. Further, a magnet holding portion 609 holds a plurality of the permanent magnets 606. In the example in the figure, two permanent magnets 606 arranged in a V shape are allocated to one pole. The V shape is oriented such that the point of the V shape points radially inward. One magnet holding portion 609 holds the two permanent magnets 606 arranged in the V shape in relation to one pole.

The permanent magnets 606 are not always arranged at an equal pitch, and the arrangement thereof is determined in accordance with the electrical design. As shown in FIG. 15, by holding permanent magnets arranged at a narrow pitch together using the magnet holding portion 609, the structure can be simplified, the intervals of the gaps can be optimized, and the airflow generated by the fan can be caused to flow through the spaces 10.

Fifth Embodiment

Figure 16:
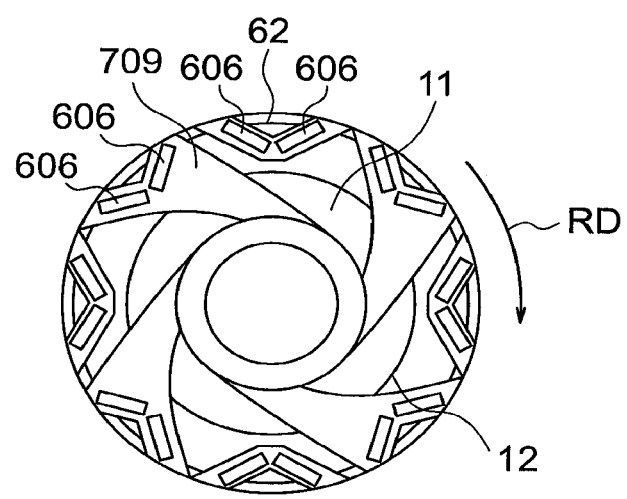
FIG. 16 is a sectional view showing a rotary electric machine according to a fifth embodiment of this invention.

Next, a fifth embodiment of this invention will be described. FIG. 16 is a sectional view showing a rotary electric machine according to the fifth embodiment of this invention. Note that except for the parts described below, the fifth embodiment is assumed to be identical to the first to fourth embodiments, described above.

In the fifth embodiment, magnet holding portions 709 serving as fan blades have curved surfaces. In the example shown in the figure, the magnet holding portions 709 are curved so as to be positioned gradually further rearward in a rotation direction RD of the rotor toward a radial direction outer side thereof. By forming the magnet holding portions 709 in a curved shape corresponding to the rotation speed or the number of blades, fan blades that are appropriate for the desired static pressure, air amount, and efficiency can be obtained. By forming the magnet holding portions 709 to curve from the inner peripheral side near the rotary axis toward the outer peripheral side, a blade shape that is suitable for the rotation condition can be obtained. In the case of a rotary electric machine that rotates in two directions, a symmetrical shape is preferable, and therefore blades having a rectilinear blade shape from the center toward the rotor outer periphery, as shown in FIG. 15, are often used. When the rotary electric machine rotates in only one direction, however, as indicated by the reference symbol RD in FIG. 16, it is more effective to provide a curved shape, as in this embodiment.

Note that likewise in this embodiment, a plane obtained by extending a wall surface 12 of the rotor opening portion 11 in the rotary axis direction is substantially flush with the fan blade surface. By forming the rotor opening portion 11 to have a similar curved shape to the fan blade, disturbance in the flow flowing out through the rotor opening portion is eliminated, leading to an improvement in the air blowing capacity.

Further, in FIG. 16, an irregular shape 62 is provided on an outer peripheral portion of the magnet holding portion 709. In the example in the figure, two permanent magnets 606 arranged in a V shape are allocated to each pole, and the V shape is oriented such that the point of the V shape points radially inward. A recessed portion is provided in the outer peripheral portion of each of the plurality of magnet holding portions 709 on the radial direction outer side thereof in alignment with the V shape, and a recessed portion is provided in the outer peripheral portion of some of the plurality of magnet holding portions 709 on the radial direction inner side thereof in alignment with the V shape.

This configuration is equivalent to providing a small centrifugal fan on the outer periphery of the magnet holding portion 709 (the magnet holding portion 709 that holds together permanent magnets provided at a narrow pitch). By forming an irregular shape on the outer peripheral side of one fan blade, a revolving component is generated in the airflow when the fan blade rotates. Accordingly, the peripheral air circulates, leading to an improvement in the cooling performance. Note that in FIGS. 15 and 16, including this embodiment, the blades increase in width from the central portion thereof toward the outer periphery, but the configurations shown in FIGS. 15 and 16 may be amended such that the width remains constant.

The specific content of this invention was described above with reference to preferred embodiments, but various amendments will be obvious to a person skilled in the art on the basis of the basic technical spirit and teachings of this invention.

REFERENCE SIGNS LIST

1 Stator core
2 Armature winding
3 Shaft
4 Rotor core
6, 606 Permanent magnet
9, 109, 609, 709 Magnet holding portion
10 Space between magnet holding portions
305, 405 Fan blade
107, 207 End plate

The invention claimed is:

1. A rotary electric machine comprising:
a stator; and
a rotor;
the stator including a stator core and an armature winding,
the rotor including a rotor core and a plurality of permanent magnets, and
the rotor core being disposed on the periphery of a shaft such that a magnetic gap is formed between the rotor core and the stator,
wherein the plurality of permanent magnets project in a rotary axis direction from an end face of the rotor core,
the rotary electric machine further comprises, on the end face of the rotor core, a magnet holding member holding respective parts of the plurality of permanent magnets that project from the end face of the rotor core, the magnet holding member includes a plurality of parts extending in a radial direction of the rotor, a plurality of magnet holding portions are provided on the plurality of parts extending in the radial direction to cover at least a part of the respective parts of the plurality of permanent magnets that project from the end face of the rotor core, the plurality of magnet holding portions have an elongated shape such that a length thereof in the radial direction of the rotor is greater than a length thereof in a circumferential direction of the rotor, spaces are provided between the plurality of magnet holding portions such that an air flow is generated by the magnet holding portions when the shaft rotates flows through the spaces, and adjacent pairs of the magnet holding portions are separated from each other on an outer peripheral side of the rotor such that the spaces open onto the outer peripheral side of the rotor.

2. The rotary electric machine of claim 1, wherein the plurality of magnet holding portions each form a part of a single magnet holding member, the magnet holding member includes an annular part disposed on an outer periphery of the shaft, and the plurality of magnet holding portions extend in the radial direction from the annular part.

3. The rotary electric machine of claim 1, wherein the plurality of magnet holding portions each form a part of a single magnet holding member, and the magnet holding member is press-fitted to the shaft.

4. The rotary electric machine of claim 1, wherein the plurality of magnet holding portions are respectively fixed to an end plate fixed to the shaft.

5. The rotary electric machine of claim 1, wherein fan blades are provided respectively in the spaces provided between the plurality of magnet holding portions.

6. The rotary electric machine of claim 1, wherein a length of each of the plurality of permanent magnets in a radial direction of the rotor is greater than a length thereof in a circumferential direction of the rotor.

7. The rotary electric machine of claim 1, wherein the magnet holding portions each hold a plurality of permanent magnets.

8. The rotary electric machine of claim 1, wherein the magnet holding portions each have curved surfaces.

9. The rotary electric machine of claim 1, wherein an irregular shape is provided in an outer peripheral portion of each of the magnet holding portions.

10. The rotary electric machine of claim 1, wherein the magnet holding portions and the permanent magnets are joined to each other by an adhesive.

11. The rotary electric machine of claim 4, wherein the plurality of magnet holding portions cover at least a part of the plurality of permanent magnets.

* * * * *